United States Patent
Imhof et al.

(12) 
(10) Patent No.: US 6,428,674 B1
(45) Date of Patent: Aug. 6, 2002

(54) PROCESS FOR THE REMOVAL OF GALVANIC ELECTROLYTIC RESIDUES FROM ELECTRODE FRAMES OR ELECTRODE FRAME WEBS WITH FIBER STRUCTURE

(75) Inventors: Otwin Imhof, Nürtingen; Holger Kistrup; Karl-Ernst Noreikat, both of Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 51 days.

(21) Appl. No.: 09/698,288

(22) Filed: Oct. 30, 2000

(30) Foreign Application Priority Data

Oct. 29, 1999 (DE) .......................................... 199 52 094

(51) Int. Cl.$^7$ ................................................ C25D 5/48
(52) U.S. Cl. ......................... 205/160; 134/21; 205/150; 205/161; 205/220; 427/350; 429/234; 429/235
(58) Field of Search ................................ 205/150, 160, 205/161, 220; 134/21; 429/234, 235; 427/350

(56) References Cited

U.S. PATENT DOCUMENTS

| | | | | |
|---|---|---|---|---|
| 5,156,899 A | * | 10/1992 | Kistrup et al. | 428/119 |
| 5,238,028 A | * | 8/1993 | Imhof et al. | 141/1.1 |
| 5,395,710 A | * | 3/1995 | Imhof et al. | 429/161 |
| 6,214,491 B1 | * | 4/2001 | Imhuf et al. | 429/21 |

FOREIGN PATENT DOCUMENTS

| | | |
|---|---|---|
| DE | 36 31 055 C1 | 5/1987 |
| DE | 37 10 895 C1 | 9/1987 |
| DE | 36 32 351 C1 | 10/1987 |
| DE | 36 32 352 C1 | 10/1987 |
| DE | 38 22 197 C1 | 8/1989 |
| DE | 39 35 368 C1 | 5/1991 |
| DE | 41 04 865 C1 | 4/1992 |
| DE | 40 40 017 C2 | 11/1992 |
| DE | 42 16 966 C1 | 5/1993 |
| DE | 40 18 486 C2 | 7/1993 |
| DE | 41 03 546 C2 | 7/1993 |
| DE | 42 25 708 C1 | 9/1993 |

\* cited by examiner

*Primary Examiner*—Donald R. Valentine
*Assistant Examiner*—William T. Leader
(74) *Attorney, Agent, or Firm*—Crowell & Moring LLP

(57) ABSTRACT

A process for the removal of galvanic electrolytic residues from galvanically reinforced fiber structure frames, where the fiber structure frame is produced through chemical metallization of a textile substrate based on fleeces or felts made of synthetic fibers and then through galvanic reinforcement of the metallized textile substrate in a galvanic bath containing a galvanic electrolyte. The invention provides that the galvanic electrolytic residues are removed by suction from the fiber structure frame. The fiber structure frame then makes contact at least once under high pressure with the wash liquid in a wash station, and subsequently the wash liquid is removed by suction from the fiber structure frame. In order to remove by suction, the galvanic electrolytic residues or the wash liquid, a belt-shaped porous supporting device is inserted between the suction port and a main area of the fiber structure frame.

19 Claims, No Drawings

PROCESS FOR THE REMOVAL OF GALVANIC ELECTROLYTIC RESIDUES FROM ELECTRODE FRAMES OR ELECTRODE FRAME WEBS WITH FIBER STRUCTURE

This application claims the priority of 199 52 094.1, filed Oct. 29, 1999, the disclosure of which is expressly incorporated by reference herein.

DISCUSSION OF BACKGROUND AND SUMMARY OF THE INVENTION

The present invention relates to a process for the removal of galvanic electrolytic residues from electrode frames or electrode frame webs with fiber structure.

For a number of years the field of alkaline storage systems for electric energy (Ni/Fe, Ni/Cd, Ni/metal hydride or nickel/hydrogen systems) has used for at least one polarity the type of fiber structure electrode that is well known and whose popularity has continued to grow. In the case of the fiber structure electrode a three dimensional lattice or network of metal filaments is provided as the frame for conducting current and for fixing the active material in position or for rendering the active material dimensionally stable. These metal filaments can be designed from solid metal or comprise synthetic fibers, whose surface is metallized by depositing either chemically and/or galvanically a metal layer. In everyday practice what has prevailed in industry are those fiber structure electrodes, where the electrically conducting fiber structure-based electrode frame, which stores the active material so as to be stable, is produced by metallizing synthetic fibers, which have solidified beforehand into a felt or fleece. Such fiber structure electrodes can be easily processed and are advantageously dimensioned and are inexpensive.

With respect to the state of the art relating to the production of fiber structure electrode frames made of metallized synthetic fiber-based fleeces or felts, reference is made, for example, to the German Patent DE 36 31 055 C2, which describes a process for continuous impregnation of fleece material or needled felt webs having a thickness ranging from 1 mm to 10 mm and a porosity ranging from 50% to 97%.

A process for chemical metallization of large area textile substrates, in particular fleece material and needled felt webs, is disclosed in German Patent DE 37 10 895 C2.

A process and a device for galvanic reinforcement or metal deposition of fiber structure electrode frames for accumulators and voltaic cells are described in the German Patent DE 42 16 966.

These metallically conducting fiber structure electrode frames are provided with a current discharge lug by welding technology after their production and optionally calibration (cf. German Patents DE 40 18 486 C2, DE 42 25 708 C2, DE 41 04 865 C1, DE 39 35 368 C1, DE 36 32 352 C1, DE 36 32 351 C1).

The fiber structure electrode frame, which is permanently connected to a current discharge lug, is provided with an active material. Three variants of these processes are described in the DE 38 22 197 C1, DE 40 40 017 C2 and DE 41 03 546 C2.

If the method of galvanic reinforcement of the chemically metallized textile substrate based on fleece material or needle felt is chosen for the metallizing process of the fleece material or needled felt strips or webs, then the fleeces or felts are usually transferred into a drip station after removal from the plating bath, brought into contact for a short period with the wash water and then separated into manipulable substrips having a length ranging from approximately 50 cm to 100 cm. In a wash centrifuge with integrated jets for wash water contact, these substrips can then be freed of the galvanic electrolytic residues present in the pores of the fiber structure electrode frame by centrifuging multiple times and then rinsing.

However, this prior art process has several disadvantages. The pores of such galvanically reinforced porous frame strips with fiber structure have a porosity ranging from approximately 50% to 90% after cutting to the width of the electrode. This metallized porous substrate-based textile substrate results in a pore size distribution, which can reach from a few $\mu$m to about 45 $\mu$m. Naturally the galvanic electrolyte is more difficult to remove from the smaller pores than from the larger pores. This means that a series of rinse and wash steps of the kind described in the prior art must be performed to reliably remove the last residues of the galvanic electrolyte. If, on the other hand, the rinse and wash steps, which are to be repeated several times, and the subsequent necessary centrifuging steps are ignored, there is the risk that residues of the galvanic electrolyte will remain in the frame strips, which result in salt crusts after the drying process. These salt crusts prevent the transfer of heat when welding the current discharge lug with the frame and thus result in increased rejects. If an inadequate weld joint between the current discharge lug and the frame does not break immediately after the welding step, but rather in a subsequent production step, such as filling the frame with active material, separating the cell stacks or even during operation of the finished cells, the damage is correspondingly greater.

If, due to incomplete removal of the galvanic electrolyte, the pores and wedges of the fiber structure frame are completely or partially clogged or filled with salt crusts, they can no longer be filled with the anticipated quantity of active material. This has a negative impact on the performance properties of the finished storage cell. Furthermore, the galvanic electrolyte that is thus dragged out can no longer be recycled into the galvanic water circulation or be properly disposed, which results in increased costs. In addition, if the galvanic electrolyte is dragged out as far as the finished cell, the buffer substance, which is present in the customary acidic nickel electrolyte, such as boric acid, may interfere with the cell operation. Finally the kind of centrifuging described in the prior art is expensive, since it cannot be done continuously and cannot be automated, especially for a smaller number of items. The frame strips must usually be placed by hand into the centrifuge and removed again by hand, which add to the expensive, in particular with respect to organization and handling.

Thus, the object of the invention is to further improve a process of the kind described above in such a manner that it can be continuous, requires fewer handling steps and decreases the quantity of water required for rinsing and the drag-out losses of the dissolved galvanic electrolytic salts.

The present invention provides that the galvanic electrolytic residues are removed by suction from the fiber structure frame and, then the fiber structure frame makes contact at least once under high pressure with the wash liquid in a wash station. Finally the wash liquid is removed by suction from the fiber structure frame. To remove the galvanic electrolytic residues or the wash liquid by suction, the fiber structure frame is transported into a suction station, which has at least one suction device with at least one suction port. Between the suction port and a main area of the fiber structure frame there is inserted a strip-shaped porous support area. The second main area and the face sides of the fiber structure frame are provided with a closed cover beyond the spread of the suction port. With the suction device the galvanic electrolytic residues or the wash liquid can be removed by suction through the supporting area from the fiber structure frame.

It is a surprising advantage that washing under high pressure is also suitable for fiber structure frames or the fiber structure frame strips, which are not very mechanically stable and which are filled with galvanic electrolytes. This feature is especially unexpected since the coalescence of the metal layers at the intersecting and contact points of the fibers of the textile substrate is only a few $\mu$m thick. Nevertheless, the galvanically reinforced fiber structure frames or the fiber structure frame strips are so dimensionally stable that they can also be subjected to such a process step as high pressure washing. The stability is most likely due to the fact that the fiber structure frame at the intersecting and contact points of the individual threads is mechanically strengthened by the coalescing of the metal layer, which is applied during galvanic reinforcement and is only a few $\mu$m thick, so that it can withstand such mechanical stresses. Thus, the fiber structure frame is stressed more during the removal of the galvanic electrolyte from the pores and wedges than would be expected by those skilled in the art. In the rinsing operation under high pressure, such fiber structure frames withstood pressures of 180 bar without any mechanical damage.

The process of the invention is especially effective when high pressure washing for cleaning the wedges and pores of such fiber structure frames is combined with a suction step. In the suction step the galvanic electrolyte or the wash liquid introduced with high pressure is removed with the aid of a porous supporting device. The supporting device increases the effectiveness of the suction process in that it is positioned between the fiber structure frame and the suction port. This further prevents partially non-metallized fibers on the outside surfaces of the fiber structure frames from being torn out so far during suction from the otherwise metallically strengthened fiber composite that they stick out. That is, they stick out beyond the plane of the main area of the fiber structure frame and can form a preferred deposition or accumulation site for gas bubbles during the charging operation of the cell.

With the process of the invention a residual moisture content of only 2 to 3% in the pores and wedges of the fiber structure frame can be obtained. Furthermore, with one to two high pressure washing and subsequent suction steps and/or with a metal coating ranging from about 150 to 300 mg/cm$^2$ of the fiber frame main area, a residual electrolytic content of less than 1 mg of dissolved metal per 100 cm$^2$ fiber frame main area can be determined. This constitutes a degree of purity that is adequate for the subsequent production steps, namely welding of the current discharge lug to the fiber structure frame or filling the fiber structure frame with active material. The wash liquid is applied locally and uniformly to all points and, at such an intensity and quantity, perpendicularly to the main area of the fiber structure frame that the liquid flows through not only preferably larger pores but also the smaller pores. Naturally even less residual concentrations of dissolved metal can be obtained by applying several, in particular more than two, high pressure wash and subsequent suction steps. This feature is especially appropriate, for example, for special individual applications.

The process of the invention is also not as aggressive with respect to the material as the wash centrifuging step described in the prior art. Both during the suction operation and the high pressure washing operation, the fiber structure frame makes uniform contact and is uniformly stressed over its entire width and its entire surface, which is not the case with the wash centrifuging operation due to the other geometry and the positioning of the nozzles for the wash liquid.

Furthermore, the process of the invention with the consecutive suction and high pressure washing operations can be designed continuously. The suction station(s) and the high pressure wash station(s) can be automatically filled. The maintenance and operation of such automatic suction and high pressure wash stations are simpler than, for example, the operation of a partially programmed wash centrifuge, used in the prior art. In particular, there is no need for the expensive programming technology. Furthermore, with continuously working suction and high pressure wash stations, it is easier than with an intermittently working wash centrifuge, to remove fiber structure frames as reject samples for quality assurance and to check their residual moisture content by a simple differential weighing.

Thus, in contrast to the intermittent centrifuging process of fiber structure frames, it is possible to check with greater accuracy the wash degree (i.e. the residual liquid content and the residual content of dissolved metal). This convenient possibility of quality assurance is an important advantage of the present invention. Thus, gradual differences in the wash degree can also be reconstructed. In the prior art intermittent process such differences cannot be detected until salt crusts from the dried galvanic electrolyte become visible to the naked eye. Thus, the process of the invention also facilitates the search for errors in the continuous production, when, for example, the cause of increased rejects must be found (for example, the current discharge lug breaks off or the requisite quantity of active compound paste cannot be filled in). Owing to the plurality of sequential individual process steps required to produce the finished single cells, such an improvement of the quality assurance in an early production step also results in a noticeable decrease in the subsequent damages in production and operation of electrochemical cells.

Thus, the process of the invention saves water, is inexpensive, environmentally safe and can be continuously designed, thus increasing the quality.

The process of the invention makes it possible to remove by suction the galvanic electrolytic residues and/or the wash liquid up to a residual liquid content ranging from about 2% to 3%. In this respect a suction capacity ranging from approximately 200 to 600 W/cm, based on the width of the preferably slotted suction port, can be used. For example, a suction port ranging from about 200 watt/cm based on the width of the suction port for an approximately 3 mm thick fiber structure frame with an average metal coating of about 150 mg metal/cm$^2$ proved to be adequate. As the vacuum generator inside the suction device, rotary liquid pumps are advantageous.

Another advantageous improvement provides that the fiber structure frame is loaded with wash liquid at a pressure ranging from approximately 50 to 180 bar. In everyday practice a pressure range between about 50 and 120 bar is adequate for many applications. Preferably water is used as the wash liquid.

Moreover, in the context of the present invention, a closed cover for the upper main area of the fiber structure frame or the fiber structure frame web and its two side faces is advantageous during the suction operation. In particular a fabric can be used as the porous supporting device and/or a solid cover.

The fiber structure frame can make contact twice or multiple times with the wash water, which can be removed by suction. The wash water is operated as a cascade according to the countercurrent principle in two or more wash stations connected in series.

Furthermore, between the second main area of the fiber structure frame and the solid cover there is at least one spacer, preferably in the form of a layer of expanded metal or the like, for example expanded nickel metal. It serves as a pressure balance in the region of the upper closed cover.

The process of the invention is especially suitable for handling fiber structure frames that, following galvanic reinforcement, exhibit a porosity ranging from approximately 50% to 90% and/or a metal reinforcement ranging from approximately 100 to 350 mg metal/cm$^2$ main frame area. After passage through the last suction station, the residual content of dissolved metal in the fiber structure frame is no more than 1 mg/100 cm$^2$ in the outer area. In particular a fiber structure frame can be used where the metal that is chemically and/or galvanically deposited on the synthetic fibers of the textile substrate is nickel or copper. In principle, however, any other galvanically deposited metal can be used.

Concrete examples are fiber structure frames based on textile substrates, fleece material or needled felt having an initial porosity ranging from 70% to 95% and a nominal thickness between 1 mm and 5 mm. After chemical metallization of synthetic fibers, weighing, for example, approximately 1.7 to 3.7 dtex, the fiber structure frames are to be galvanically reinforced. The metal layer, applied during galvanic reinforcement, results in a porosity of about 50% to 90% of the final fiber structure frame, which is in the usual range for fiber structure electrode frames.

Other objects, advantages and novel features of the present invention will become apparent from the following detailed description of the invention when considered in conjunction with the accompanying drawings.

DETAILED DESCRIPTION

The present invention is explained in detail below with reference to one embodiment, which does not in any way have a limiting effect on the application of the inventive idea.

A polypropylene needle felt with a fiber weight of 2.7 dtex, a staple length of fibers of 40 mm, a nominal thickness of 2.3 mm and a weight per area of 190 g/m$^2$ was activated in the customary manner on a Pd/Sn basis and then chemically nickeled. After removal of the spent metallization solution from the pores and wedges of the premetallized needle felt, it was galvanically nickeled, where the average nickel coating was approximately 170 mg/cm$^2$. The content of galvanic nickel bath was approximately 400 g/l nickel sulfate heptahydrate, 50 g/nickel chloride hexahydrate and about 45 g/l boric acid. The bath temperature was 52° C. and the pH value was 2.5 during galvanic reinforcement. After removal from the galvanic station, the fiber frame web strips, which are still filled with galvanic electrolyte, were cut to the electrode format and passed into a suction station. In this suction station the fiber structure frame was laid on a continuously revolving belt in the form of a supporting fabric, which exhibits, at the bottom approximately in the center of its length, a suction device with a slotted suction port. The fiber structure frame was provided with a closed cover, for example in the form of a fabric over the upper main area and over its two side faces with intercalation of an expanded nickel metal and guided over the revolving continuous belt to the suction device, where the galvanic electrolyte is removed by suction passing downward through the supporting fabric. The suction capacity was approximately 400 W/cm based on the width of the suction slot. Then the fiber structure frame passed through a second station, where the frame was rinsed with jets of a high pressure washing system at a pressure of 80 bar. Then the fiber structure frame, which had been provided again with a cover, passed through a suction station, where the rinse water, introduced at high pressure, was again removed by suction from the bottom over a continuously revolving belt in the form of a support fabric, in accordance with the first suction station for removal of the galvanic electrolyte. After the first suction station the residual liquid content of the fiber structure frame was approximately 2% and after the second suction station also approximately 2%. The residual content of dissolved metal was determined by boiling the fiber structure frame, cut into strips, with distilled water. The result was a value of 0.7 mg Ni, based on 100 cm$^2$ of the main area of the fiber structure frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for removing galvanic electrolytic residues from a galvanically reinforced fiber structure frame, produced through chemical metallization of a textile substrate based on fleeces or felts made of synthetic fibers and subjected to galvanic reinforcement of the metallized textile substrate in a galvanic bath containing a galvanic electrolyte, said process comprising the steps of:

removing by suctioning the galvanic electrolyte residues from the fiber structure frame;

subjecting the fiber structure frame to a wash liquid in a wash station; and removing the wash liquid by suction from the fiber structure frame;

wherein the step of removing galvanic electrolytic residues includes transporting the fiber structure frame into a suction station having at least one suction device with a suction port and inserting a porous supporting device between the suction port and a main area of the fibre structure frame; and suctioning the galvanic electrolyte residues through the supporting device.

2. The process according to claim 1, wherein the step of removing the wash liquid includes suctioning the wash liquid through the supporting device by suction.

3. The process according to claim 2, wherein the wash liquid is removed up to a residual liquid content of a maximum of 3% in pores and wedges of the fiber structure frame.

4. The process according to claim 2, wherein the wash liquid is removed by suction to a residual liquid content of approximately 2–3%.

5. The process according to claim 2, wherein the wash liquid is removed by suction at a suction capacity ranging from approximately 200 to 600 Wc/m based on the width of the suction port which is slotted.

6. Process according to claim 1, wherein the galvanic electrolyte residues are removed by suction up to a residual liquid content of a maximum of 3% in pores and wedges of the fiber structure frame.

7. The process according to claim 1, wherein the galvanic electrolytic residues are removed by suction to a residual liquid content of approximately 2–3%.

8. The process according to claim 1, wherein the galvanic electrolytic residues are removed by suction at a suction capacity ranging from approximately 200 to 600 W/cm based on the width of the suction port wherein said suction port is slotted.

9. The process according to claim 1, wherein the fiber structure frame makes contact with the wash liquid at a pressure of approximately 50 to 180 bar.

10. The process according to claim 9, wherein the fiber structure frame makes contact with the wash liquid at a pressure of approximately 120 bar.

11. The process according to claim 1, wherein the wash liquid is water.

12. The process according to claim 1, wherein a second main area and side faces of the fiber structure frame are provided with a closed cover.

13. A process according to claim 12, wherein at least one expanded metal spacer is positioned between the second main area of the fiber structure frame and the closed cover.

14. The process according to claim 1, wherein a fabric is used as a belt-shaped support surface for the support device.

15. The process according to claim 1, wherein the structure fiber frame makes contact with the wash water at least twice and wherein said wash water is subsequently removed by suction.

16. A process according to claim 15, wherein the wash water is operated as a cascade according to a counter current principle in at least two wash stations connected in series.

17. The process according to claim 1, wherein following galvanic reinforcement, said fiber structure frame has at least one of a porosity ranging from approximately 50–90% and a metallic reinforcement ranging from approximately 150–300 mg metal/cm$^2$ frame main area.

18. The process according to claim 1, wherein, after passage through the suction device, the residual content of dissolved metal in the fiber structure frame is no more than 1 mg/100 cm$^2$ outer area.

19. The process according to claim 1, wherein said fiber structure frame includes a metal which is at least one of chemically and galvanically deposited on synthetic fibers of the textile substrate and wherein said metal is one of nickel and copper.

* * * * *